May 2, 1967 A. R. THOMPSON ETAL 3,317,916
D'ARSONVAL MOTOR

Filed Nov. 9, 1964 2 Sheets-Sheet 1

INVENTORS
ALLAN R. THOMPSON
FRANK EUBEL, JR.
BY
*Eber J. Hyde*
ATTORNEY

May 2, 1967 A. R. THOMPSON ET AL 3,317,916
D'ARSONVAL MOTOR
Filed Nov. 9, 1964 2 Sheets-Sheet 2
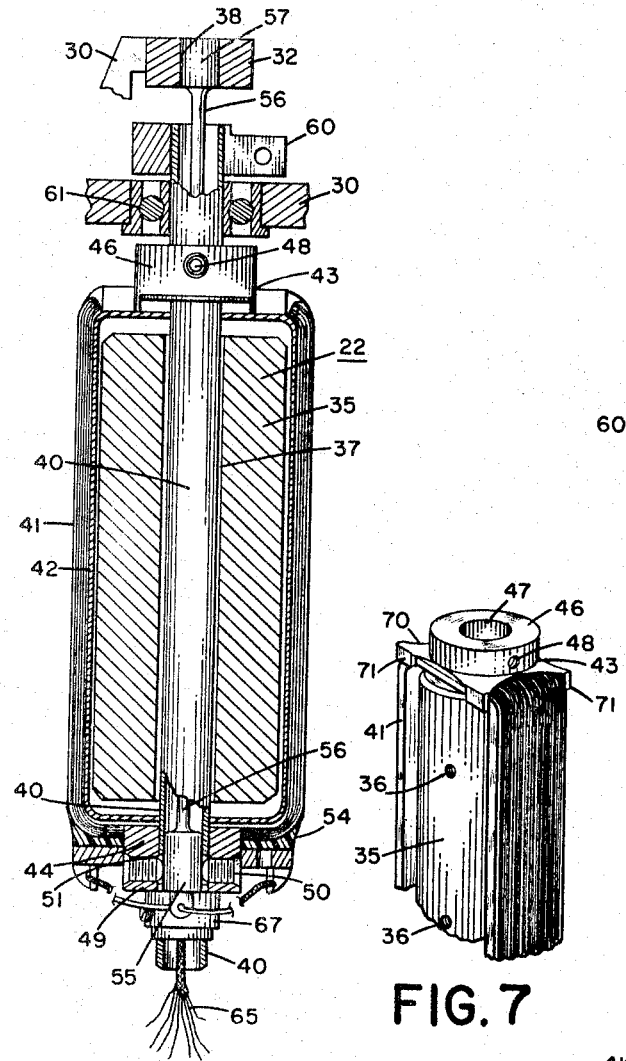
FIG. 4
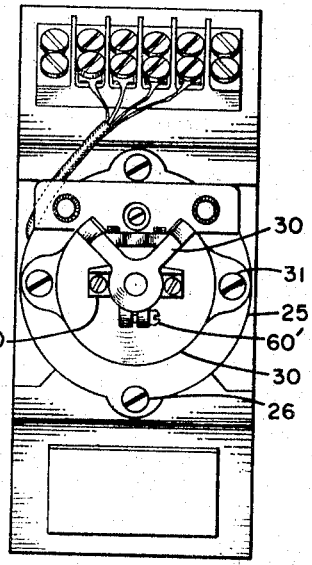
FIG. 3
FIG. 7
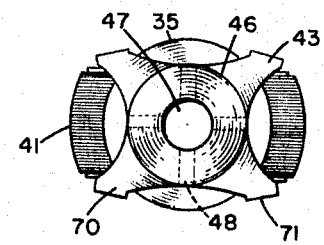
FIG. 6
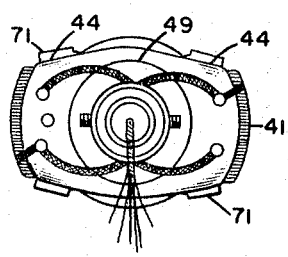
FIG. 5
INVENTORS
ALLAN R. THOMPSON
BY  FRANK EUBEL, JR.
*Elver J. Hyde*
ATTORNEY United States Patent Office 3,317,916
Patented May 2, 1967

3,317,916
D'ARSONVAL MOTOR
Allan R. Thompson, Westlake, and Frank Eubel, Jr., Cleveland, Ohio, assignors to Clevite Corporation, a corporation of Ohio
Filed Nov. 9, 1964, Ser. No. 409,833
12 Claims. (Cl. 346—139)

This invention pertains to a D'Arsonval motor or galvanometer such as is used in direct writing ink, thermal or electric stylus writing devices.

In the past D'Arsonval galvanometers have been constructed with one or more of the restoring springs or torsion bars connected to the coil and extending above or below the coil assembly, or both. An example of one such device is shown in the Shaper Patent 2,478,329, assigned by mesne assignment to the assignee of the present invention. In the Shaper device the torsion wire extended away from the coil into the space between the legs of the horseshoe magnet, and the coil centering mechanism actuated the torsion wire and extended out of the side of the device.

In the present device the torsion bar or wire does not extend directly away from the coil thereby facilitating the construction of a relatively compact, powerful, galvanometer motor, and it makes possible adjusting the coil position from the top. Thus many of these galvanometers can be placed side-by-side in a multichannel instrument and the coil position of each can readily be adjusted from the top. This is very advantageous to the operator, and it reduces the overall width of the multichannel instrument.

Another object of the invention is to provide a D'Arsonval galvanometer or penmotor wherein the pen location can be adjusted from the top, thereby to be readily accessible to the operator, and thereby to facilitate a multichannel instrument wherein the individual penmotors are closely packed side-by-side.

Still another object of the invention is to provide a penmotor wherein the pen or stylus can easily be replaced and the replacement pen or stylus will occupy exactly the same position as the discarded pen or stylus.

For a better understanding of the present invention, together with other and further objects thereof, reference is had to the following description taken in connection with the accompanying drawings, and its scope will be pointed out in the appended claims.

An aspect of the present invention lies in the provision of a D'Arsonval type motor or galvanometer which comprises a powerful magnet having an air gap. A coil is mounted in the air gap and a hollow drive rod extends through the coil and is connected to it. A torsion wire or rod extends coaxially through the hollow drive rod and one end, for example the bottom end, of the torsion wire is secured to the bottom end of the hollow drive rod. Holding the centering means are connected to the magnet and they hold and center the end of the torsion wire opposite its connected end, for example they hold the top end of the torsion wire against rotation. An indicating means such as an inking pen, an electric stylus, a thermal pen or a mirror is secured to the end of the drive rod away from its connected end, for example, to its top end, so that the indicating means rotates as the coil and the hollow rod rotate in the magnetic field.

FIGURE 3 is a top view of the motor.

FIGURE 4 is an enlarged sectional view taken through the drive coil subassembly.

FIGURE 5 is a bottom view of the drive coil subassembly.

FIGURE 6 is a top view of the drive coil subassembly.

FIGURE 7 is an isometric view of the top portion of the drive coil subassembly with adhesive material removed to more clearly show the structure.

Figure 8:
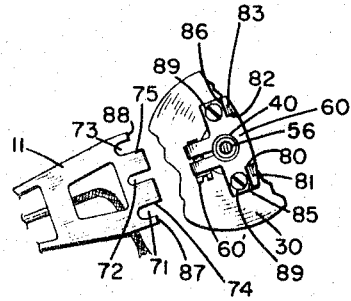
FIGURE 8 shows details of the writing instrument mounting device.
Figure 1:
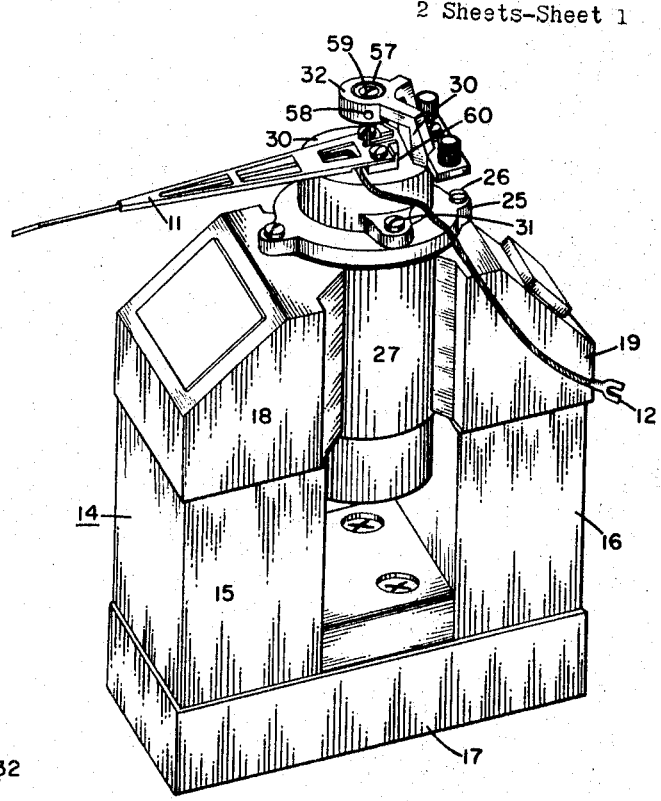
FIGURE 1 is an isometric view of a D'Arsonval type motor or galvanometer embodying the invention.
Figure 2:
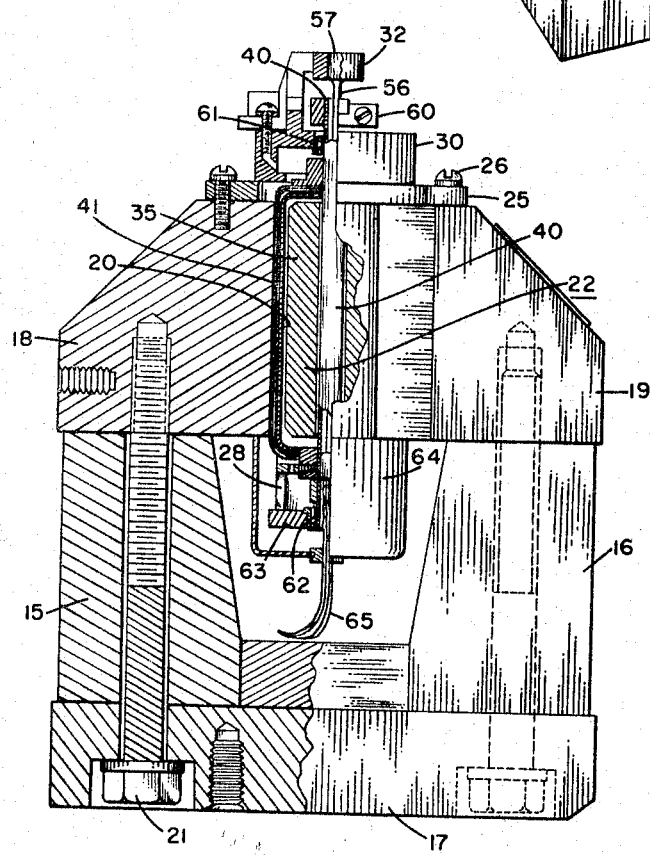
FIGURE 2 is a half-section side view of the galvanometer shown in FIGURE 1.

With reference to the drawings there is shown a D'Arsonval motor device 10 for driving a thermal stylus 11 which can be connected to a suitable source of electric current to write on thermal sensitive material. It is to be understood, however, that the motor or galvanometer could comprise an inking pen or a mirror for reflecting light to light sensitive film. The details of the particular indicating means are not important to the present invention.

The motor device 10 includes a powerful magnetic circuit 14 formed of two bar magnets 15, 16, a base 17 formed of ferro-magnetic material and two pole tips 18 and 19 of ferromagnetic material bolted together by bolts 21 and defining an air gap 20. Instead of the separate pole tips and base a single horseshoe magnet could be used, as is known in the art.

A coil subassembly 22 (FIG. 4) is mounted in the air gay by means of a non-magnetic collar 25 secured to the pole pieces 18 and 19 by means of screws 26. Integral with the collar 26 are two non-magnetic side members 27, 28 which extend downwardly in the air gap 20, and which together with the pole pieces 18, 19 enclose the coil subassembly 22. A holding and centering means 30 is held to the collar 25 by screws 31 and it includes an upwardly extending centering device 32 which is located substantially above the center line of the air gap 20. A soft iron core 35 is mounted on the non-magnetic side member 28 by means of screws (not shown) which extend through the side piece 28 into holes 36 in the core 35 (FIGURE 7). The core 35 has a bore 37 extending axially through it and aligned with a hole 38 in the centering device 32. A hollow drive rod 40 extends through the bore 37 and is spaced slightly from the core 35 so that the drive rod can rotate in respect to the stationary core 35.

A coil 41 is wound about a coil form 42 and is connected to a top spider 43 and a bottom spider 44. A connecting collar 46 is integral with the top spider 43, and the drive rod 40 extends through hole 47 and is tightly secured thereto by a plurality of set screws 48 which extend through the collar 46 into engagement with the drive rod 40. The bottom of the coil similarly is connected to the bottom spider 44 which includes integral connecting collar 49, and a plurality of set screws 50 extend through the collar 49, through holes 51 in the lower end of the drive rod 40 and into tight engagement with an enlarged end portion 55 of a torsion wire 56, thereby connecting together at the bottom end of the subassembly the coil 41, the drive rod 40, and the torsion wire 56. Adhesive material 54 may also be applied at the ends of the coil to increase the rigidity of the connection between the coil and the spiders 43, 44, as will later be more fully described.

The torsion wire or rod 56 extends through the hollow drive rod 40 and terminates with an enlarged end portion 57 positioned in the hole in the centering device 32. Set screws 58 hold the upper end of the torsion wire against rotation in respect to the holding and centering device 30, 32, but the set screw 58 may be loosened and a screw driver inserted in slot 59 in the end portion 57, thereby to turn the torsion wire and the entire coil subassembly in respect to the magnet system. This adjusts the centering of the stylus or pen 11 in respect to the instrument, as the stylus 11 is connected to the upper end of the drive rod 40 by means of collar 60. The details of this connection are described in more detail in connection with FIGURE 8.

Since the coil subassembly rotates in respect to the magnet system on which it is mounted, bearings 61 and 62 are provided at the top and the bottom, the top bearing 61 being located between the hollow drive rod 40 and the stationary holding and centering device 30, and the bottom bearing 62 being located between a collar 67 on the drive rod 40 and a base member 63 which interconnects and holds together the rigid side members 27, 28. A light metal cap 64 frictionally engages the rigid side members 27, 28 to enclose the bottom bearing 62, and the several wires 65 which go to the coil 41 extend through grommet 66 and up into the hollow drive rod 40.

In order to securely hold the coil 41 each of the spiders 43, 44 has four outwardly extending arms 70, each terminating in an inwardly turned finger 71 which is located outside of the edge of the coil 41. Each of the spiders and their arms and fingers are integrally formed of metal, and together they hold the coil in compression at its top and at its bottom. When the motor is driven at frequencies and amplitudes where several watts of power are delivered to the coil the copper in the coil becomes hot, thereby softening the adhesives 54 used to help hold the many turns of wire together, and used at the top and bottom of the coil subassembly. This softening, together with the high centrifugal forces which are present, has in prior devices caused the coil to become separated or loose from the drive rod, thereby hastening the end of the life of the instrument. With the fingers 71 firmly holding the ends of the coil in compression at eight places, and with the metal spiders firmly connected to the drive rod, the life of the device is extended. Also, the adhesive at the ends never is placed in tension or shear. Further, the metal spiders are in close heat transfer relation to the coil, serving to collect heat and transfer it to the hollow drive rod 40 and to the other metal parts for dissipation and coller operation.

As is shown in detail in FIGURE 8 the pen 11 has an end portion which is slotted at 71, 72 and 73. Edges 74 and 75 of slots 71 and 73 are parallel to each other, and the spacing between them is carefully controlled so that when the pen is in place the edge 74 engages edge 80 on lug 81 and edge 75 engages edge 82 on lug 83. Lugs 81 and 83 are integral with the collar 60 which is secured to the upper end of the drive rod 40 by screw 60'. The forward faces 85, 86 of the lugs 81, 83 engage the faces 87, 88 on the pens 11, and torsion wire 56 extends through slot 72. Screws 89 hold the pen tightly in place against the collar 60. Thus the pen is accurately located by the carefully machined faces 80, 85 of lug 81 and by the carefully machined faces 82, 86 of lug 83, thereby to carefully locate the pen in two directions in one plane. The screws 89 hold the pen against the top face of the collar 60, thereby to carefully locate the pen in the third direction. With such a device replacement pens are easily inserted into almost exactly the same position as the pen taken out.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

We claim:

1. A D'Arsonval motor comprising, in combination, a magnet having an air gap, a coil in said air gap, a hollow drive rod extending through said coil and connected to it, means holding and centering said hollow drive rod and said coil in respect to said magnet and for rotary motion in respect thereto, said hollow drive rod having a first end and a second end, a torsion wire extending coaxially through said hollow drive rod and having a first end and a second end, means securing the second end of said torsion wire to the second end of said hollow rod, holding and centering means connected to said magnet for holding and centering the first end of said torsion wire, and indicating means connected to the first end of said hollow rod for rotating as said rod and said coil rotate in said magnetic field.

2. A D'Arsonval rotor as set forth in claim 1, further characterized by spider means connected to said coil at each end thereof, and means connecting each of said spider means to said hollow drive rod.

3. A D'Arsonval motor as set forth in claim 2, further characterized by said spider means having arms which extend radially outwardly from said drive rod and which extend around portions of said coil to hold said coil portions against radial outward movement due to centrifugal force as said coil rotates.

4. A D'Arsonval motor as set forth in claim 2, further characterized by means holding said second end of said drive rod and of said torsion wire to said spider means thereby to secure both said drive rod and said torsion wire to said coil.

5. A D'Arsonval motor comprising, in combination, a magnet having an air gap, a coil, in said air gap, a hollow drive rod extending through said coil and connected to it, means holding and centering said hollow drive rod and said coil in respect to said magnet and for rotary motion in respect thereto, said hollow drive rod having a first end and second end, a torsion wire extending coaxially through said hollow drive rod and having a first end and a second end, means securing the second end of said torsion wire to the second end of said hollow rod, the portion of said torsion wire extending away from the said secured second end being spaced from and coaxial with said hollow drive rod, and said first end of said torsion wire extending out of the first end of said hollow drive rod, holding and centering means connected to said magnet for holding and centering the first end of said torsion wire in respect to the first end of said hollow drive rod, and indicating means connected to the first end of said hollow rod for rotating as said rod and said coil rotate in said magnetic field.

6. A D'Arsonval motor as set forth in claim 5, further characterized by adjustment means at the first end of said torsion wire to adjust its rotational position in respect to said holding and centering means thereby also to adjust the position of said drive rod, said coil and said indicating means in respect to said magnet.

7. A D'Arsonval motor as set forth in claim 6, further characterized by said torsion wire having enlarged portions at said first and second ends thereof, the enlarged portion at the second end thereof being secured to said hollow drive rod and the said enlarged portion being secured to said holding and centering means.

8. A D'Arsonval motor as set forth in claim 6, further characterized by said adjustment means being located beyond the first end of said hollow drive rod.

9. A D'Arsonval motor for a pen recorder as set forth in claim 6, further characterized by pen connecting means connected to the said first end of said hollow drive rod for securing thereto a pen mechanism.

10. A D'Arsonval pen mtor as set forth in claim 9, for use with a replaceable pen having at its connection end two pen aligning surface means at a 90 degree angle to each other, said pen motor being further characterized by said pen connecting means having two locating surfaces at said given angle for engaging said pen aligning surface means for locating the pen in two directions, and means for holding the pen against said pen connecting means with said two pen aligning surface means in engagement with said two locating surfaces thereby locating the pen in said pen connecting means.

11. A replaceable indicator for an instrument having at least two locating surfaces at a 90 degree angle to each other and raised above a planar locating surface, said indicator having an end face portion to be connected face to face against said planar locating surface and having at least two locating surfaces at said given angle to each other for engaging said two locating surfaces on said instrument thereby to accurately locate said indicator in respect to said instrument in three directions.

12. A D'Arsonval motor comprising, in combination, a magnet having an air gap, a coil in said air gap, a drive rod extending through said coil, spider means rigidly connecting each end of said coil to said drive rod, said spider means having outwardly extending metal heat conductive arms with portions located outside the edges of said coil to hold said coil in compression against centrifugal forces exerted thereon, holding and centering means connected to said magnet and connected to said drive rod for holding and centering said drive rod, and indicating means connected to said drive rod for rotating as said rod and said coil rotate in said magnetic field.

References Cited by the Examiner

UNITED STATES PATENTS

| | | | |
|---|---|---|---|
| 1,906,514 | 5/1933 | Beck | 346—139 |
| 2,199,078 | 4/1940 | Lindemann | 346—140 |
| 2,499,632 | 3/1950 | Cooke | 310—39 |
| 3,008,070 | 11/1961 | Nemeth | 317—171 |
| 3,088,788 | 5/1963 | Brown et al. | 346—117 |
| 3,217,728 | 11/1965 | Pegrom | 317—171 |

RICHARD B. WILKINSON, *Primary Examiner.*

J. G. MURRAY, *Assistant Examiner.*